United States Patent Office 2,782,188
Patented Feb. 19, 1957

2,782,188

MONOAZO DYESTUFFS

Ernst Merian, Allschwil, near Basel, Switzerland, assignor, by mesne assignments, to Saul & Co., Newark, N. J., as nominee of Fidelity Union Trust Company No Drawing. Application April 20, 1953,
Serial No. 349,983

Claims priority, application Switzerland April 22, 1952

6 Claims. (Cl. 260—207.1)

The present invention relates to new monoazo dyestuffs which dye acetate silk fibers, polyamide fibers and polyester fibers in purge orange to red shades, and the dyeings of which are distinguished by excellent fastness to light, washing and sublimation and, additionally, are stable with respect to so-called "gas fumes" (combustion gases).

The monoazo dyestuffs of the present invention correspond to the formula

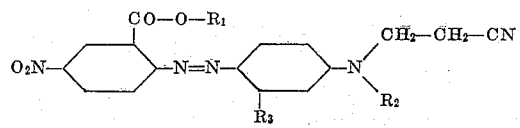

wherein each of $R_1$ and $R_2$ stands for lower alkyl, lower hydroxyalkyl or lower alkoxyalkyl, and $R_3$ stands for hydrogen, halogen, lower alkyl or lower alkoxy.

The dyeings of these new dyestuffs on acetate silk are greatly superior with respect to fastness to light as compared to those of corresponding dyestuffs containing no cyanoalkyl group. Moreover they are characterized by outstanding fastness with respect to so-called "gas fumes." Surprisingly the dyeings are also much faster to light and "gas fumes" than those of corresponding dyestuffs containing no carboxylic ester group. The dyeings of these dyestuffs on synthetic polyamide fibers and on polyester fibers too are improved in a similar way with respect to fastness properties though not in the same size. An object of the present invention is thus the improvement of the fastness properties of acetate dyes comprising an azo component of the series of tertiary amines. This is accomplished according to the present invention by the introduction of both a cyanoalkyl group into the azo component and a carboxylic ester group into the nucleus of the diazo component.

The said monoazo dyestuffs can be prepared by coupling 1 mol of the diazo compound of a 2-amino-5-nitrobenzene-1-carboxylic acid derivative of the formula

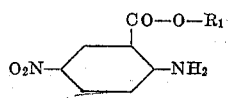

wherein $R_1$ stands for lower alkyl, lower hydroxyalkyl or lower alkoxyalkyl, with 1 mol of a tertiary amine of the formula

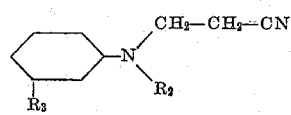

wherein $R_2$ stands for lower alkyl, lower hydroxyalkyl or lower alkoxyalkyl, and $R_3$ stands for hydrogen, halogen, lower alkyl or lower alkoxy.

Lower alkyl throughout the specification stands for methyl, ethyl, propyl or butyl, whereas halogen means chlorine or bromine.

Illustrative of amines which may be employed in preparing diazo compounds suitable for use in making the monoazo dyestuffs of the present invention are, among others, the methyl ester, the ethyl ester, the propyl ester, the butyl ester, the β-hydroxy-ethyl ester, the glyceryl mono ester, the β-methoxy-ethyl ester and the β-ethoxy-ethyl ester of 2-amino-5-nitrobenzene-1-carboxylic acid. They are generally known compounds and may be produced by esterification of the said carboxylic acid by lower alcohols.

Suitable azo components for coupling with the diazo compounds enumerated in the preceding paragraph are for example N-methyl-N-cyanoethyl-aminobenzene, N-ethyl - N - cyanoethyl - aminobenzene, N - hydroxy-ethyl-N-cyanoethyl-aminobenzene, N-hydroxypropyl-N-cyanoethyl-aminobenzene, N-hydroxybutyl-N-cyanoethyl-aminobenzene, N-methoxyethyl-N-cyanoethyl-aminobenzene, 1 - (N - methyl - N - cyanoethyl) - amino - 3-methylbenzene, 1-(N-ethyl-N-cyanoethyl)-amino-3-methylbenzene, 1 - (N - hydroxyethyl - N - cyanoethyl) - amino-3-methylbenzene, 1-(N-hydroxypropyl-N-cyanoethyl) - amino - 3 - methylbenzene, 1 - (N - methyl - N-cyanoethyl) - amino - 3 - chlorobenzene, 1 - (N - ethyl-N - cyanoethyl) - amino - 3 - chlorobenzene, 1 - (N-hydroxyethyl - N - cyanoethyl) - amino - 3 - chlorobenzene, 1 - (N - methyl - N - cyanoethyl) - amino - 3-bromobenzene, 1 - (N - ethyl - N - cyanoethyl) - amino-3 - bromobenzene, 1 - (N - hydroxyethyl-N-cyanoethyl) - amino - 3 - bromobenzene, 1 - (N - hydroxyethyl - N-cyanoethyl)-amino-3-methoxybenzene, 1-(N-hydroxyethyl-N-cyanoethyl)-amino-3-ethoxybenzene, 1-(N-hydroxyethyl-N-cyanoethyl)-amino-3-ethylbenzene, etc.

The following examples illustrate the invention without, however, being restrictive thereof. In the said examples the parts and percentages are by weight, and the temperatures are in degrees centigrade.

Example 1

5 parts of sodium nitrite are added to 60 parts of concentrated sulfuric acid at 60° in the course of 1 hour. The solution is cooled to 10–20° and then diluted with 65 parts of concentrated acetic acid, whereupon 13 parts of 2-amino-5-nitrobenzene-1-carboxylic acid methyl ester are added at 10–15°. Then 65 parts of concentrated acetic acid are added dropwise, and the excess of nitrite destroyed by means of 2 parts of urea. The diazo solution is poured onto 750 parts of ice, and the coupling is carried out with a solution of 14 parts of 1-(N-hydroxyethyl-N-cyanoethyl)-amino-3-methylbenzene in 150 parts of water, 70 parts of ice and 16 parts of 30% hydrochloric acid. The formed dyestuff separates soon in form of dark red needles. It is filtered off, washed free of acid and dried. It corresponds to the formula

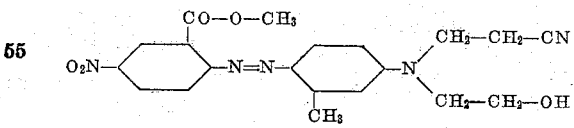

and dyes acetate silk in scarlet shades of outstanding fastness properties. The new dyestuff is twice as fast to light, four times as fast to "gas fumes" and much faster to washing than the corresponding dyestuff of the formula

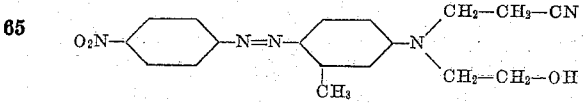

which contains no carboxylic ester group. Polyamide fibers, known under the name of "nylon" or "Perlon" are dyed in somewhat bluisher shades of good fastness properties, while the scarlet dyeings on polyester fibers, known for instance under the name of "Dacron," have excellent fastness to light.

*Example 2*

20 parts of 2-amino-5-nitrobenzene-1-carboxylic acid methyl ester are dissolved in 100 parts of concentrated sulfuric acid. The solution is poured onto 300 parts of ice. The yellowish suspension so obtained is filtered off, washed free from acid and, without drying, stirred up in 60 parts of 30% hydrochloric acid. After some time 7 parts of sodium nitrite are added, whereupon coupling is carried out with a solution of 16 parts of N-methyl-N-cyanoethyl-aminobenzene in 230 parts of water, 21 parts of 30% hydrochloric acid and 200 parts of ice. After isolation in the usual way, a dyestuff melting at 136° is obtained, which corresponds to the following formula

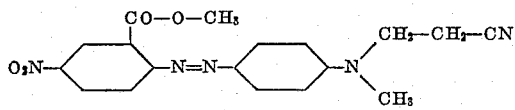

It dyes acetate silk in reddish orange shades of outstanding fastness to light and "gas fumes." The dyeings on polyester fibers are brilliant scarlet in shade and possess very good fastness properties.

Dyestuffs of similar properties as those described in the present example and obtainable in analogous manner are the following ones:

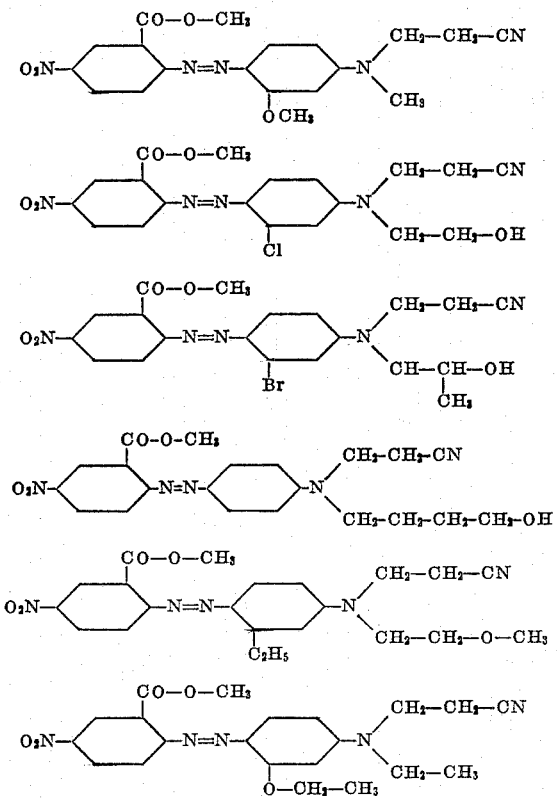

*Example 3*

20 parts of 2-amino-5-nitrobenzene-1-carboxylic acid methyl ester are diazotized as described in Example 2, while coupling is carried out with a solution of 18 parts of N-ethyl-N-cyanoethyl-aminobenzene in 230 parts of water, 21 parts of 30% hydrochloric acid and 200 parts of ice. After filtration, washing and drying of the dyestuff a product corresponding to the formula

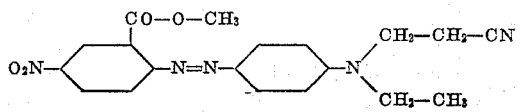

and melting at 163° is obtained, which dyes acetate silk in scarlet shades possessing outstanding fastness properties.

*Example 4*

25 parts of 2-amino-5-nitrobenzene-1-carboxylic acid ethoxyethyl ester are diazotized as described in Example 2, while coupling is carried out with a solution of 19 parts of N-hydroxyethyl-N-cyanoethyl-aminobenzene in 2000 parts of water, 25 parts of 30% hydrochloric acid and 200 parts of ice. A reddish orange acetate dyestuff is obtained which corresponds to the formula

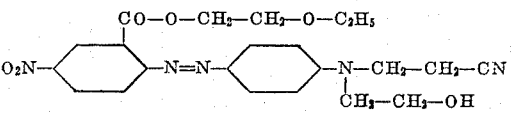

Dyestuffs of similar properties as those described in the present example and obtainable in analogous manner are the following ones:

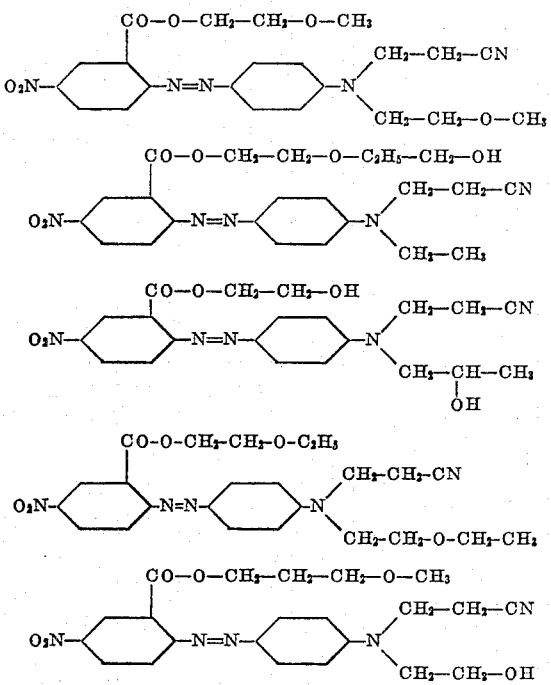

*Example 5*

20 parts of 2-amino-5-nitrobenzene-1-carboxylic acid methyl ester are diazotized as described in Example 2, while coupling is carried out with a solution of 19 parts of N - hydroxyethyl - N - cyanoethyl - aminobenzene in 2000 parts of water, 25 parts of 30% hydrochloric acid and 200 parts of ice. The dyestuff thus obtained corresponds to the formula

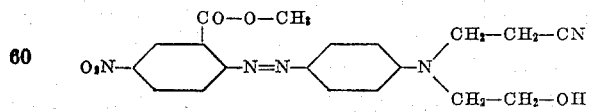

and dyes acetate silk and polyester fibers in brilliant reddish orange shades of outstanding fastness properties, the shades on polyamide fibers being somewhat redder in tone.

*Example 6*

If in the Example 5 the 20 parts of 2-amino-5-nitrobenzene-1-carboxylic acid methyl ester are replaced by 21 parts of 2-amino-5-nitrobenzene-1-carboxylic acid ethyl ester or by 23 parts of 2-amino-5-nitrobenzene-1-carboxylic acid hydroxyethyl ester and coupling is carried out with 20.4 parts of 1-(N-hydroxyethyl-N-cyanoethyl)-amino-3-methylbenzene, similar dyestuffs are obtained after filtration, washing free from acid and drying, which correspond to the formula

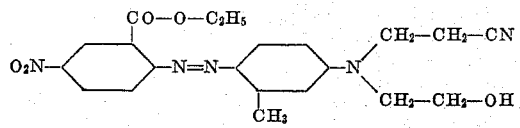

respectively

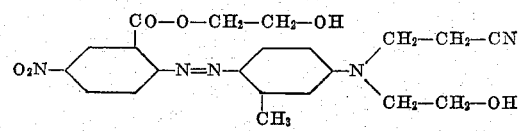

*Example 7*

23 parts of 2-amino-5-nitrobenzene-1-carboxylic acid are dissolved in 100 parts of concentrated sulfuric acid, whereupon 25 parts of methanol are added drop by drop. The temperature is raised up to 80° and after some time esterification is finished. Without isolation of the intermediate product, 9 parts of sodium nitrite are now added in small portions at 60° to the well agitated mass which is held at 60–70° for one further hour. Then it is poured onto 1500 parts of water and 500 parts of ice. At about 0° a solution of 23 parts of 1-(N-hydroxyethyl-N-cyanoethyl)-3-methylbenzene in 31 parts of 30% hydrochloric acid and 50 parts of water is added and the coupling carried out in the usual manner. After some time the dyestuff precipitates and is isolated in the usual way. It is identical with the dyestuff of Example 1.

*Example 8*

1.5 parts of the dyestuff according to Example 1 is dispersed with the aid of Turkey red oil, and the resultant dispersion used for dyeing 100 parts of acetate silk in a soap bath in the conventional way, preferably at elevated temperature. Pure scarlet shades of excellent fastness properties are obtained. To enhance the dispersion, the dyestuff may be ground, prior to the dyeing process, with a wetting agent, dispersing agent or emulsifier, preferably in the presence of an inorganic salt such as sodium sulfate.

In a similar manner synthetic polyamid fibers and polyester fibers may be dyed, whereby the temperature is preferably raised up to the boil or even higher, if closed vessels are used; the shades differing only to a small extent.

Having thus disclosed the invention, what is claimed is:
1. A monoazo dyestuff which corresponds to the formula

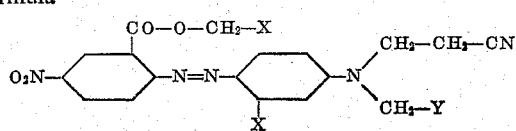

wherein each X stands for a member selected from the group consisting of hydrogen and methyl, and wherein Y stands for a member selected from the group consisting of hydrogen, methyl, hydroxymethyl, hydroxyethyl and hydroxypropyl.

2. The monoazo dyestuff which corresponds to the formula

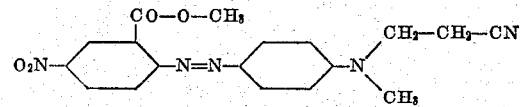

3. The monoazo dyestuff which corresponds to the formula

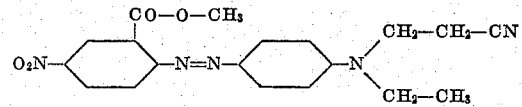

4. The monoazo dyestuff which corresponds to the formula

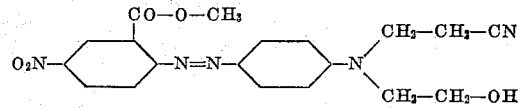

5. The monoazo dyestuff which corresponds to the formula

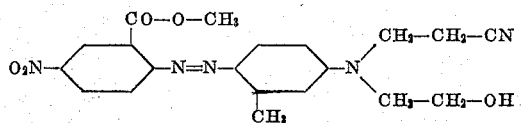

6. The monoazo dyestuff which corresponds to the formula

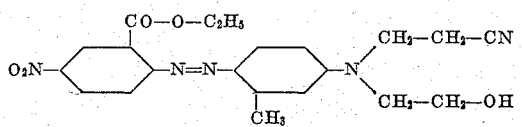

References Cited in the file of this patent
UNITED STATES PATENTS

| | | |
|---|---|---|
| 2,135,008 | Kleiner et al. | Nov. 1, 1938 |
| 2,387,987 | Felix | Oct. 30, 1945 |
| 2,492,971 | Dickey | Jan. 3, 1950 |